(12) United States Patent
Lee (10) Patent No.: US 9,385,530 B2
(45) Date of Patent: Jul. 5, 2016

(54) INPUT LINE SELECTOR SYSTEM FOR BATTERY CHARGERS

(71) Applicant: Gilbert S. Lee, Seoul (KR)

(72) Inventor: Gilbert S. Lee, Seoul (KR)

(73) Assignee: Alpha and Omega Semiconductor (Cayman), Ltd., Sunnyvale, CA (US)

( * ) Notice: Subject to any disclaimer, the term of this patent is extended or adjusted under 35 U.S.C. 154(b) by 769 days.

(21) Appl. No.: 13/711,614

(22) Filed: Dec. 12, 2012

(65) Prior Publication Data

US 2014/0159496 A1    Jun. 12, 2014

(51) Int. Cl.
*H02J 4/00*    (2006.01)
*H02J 1/10*    (2006.01)

(52) U.S. Cl.
CPC .............. *H02J 1/10* (2013.01); *Y10T 307/696* (2015.04)

(58) Field of Classification Search
CPC ............................. H02J 1/10; Y10T 307/696
USPC .......................................................... 307/80
See application file for complete search history.

(56) References Cited

U.S. PATENT DOCUMENTS

| | | | |
|---|---|---|---|
| 6,522,190 B1* | 2/2003 | Malik | H02J 1/10 307/64 |
| 7,709,976 B2 | 5/2010 | Bazinet | |
| 2011/0156483 A1* | 6/2011 | Caraghiorghiopol | G06F 1/263 307/66 |

FOREIGN PATENT DOCUMENTS

CN    102769314 A    11/2012

* cited by examiner

*Primary Examiner* — Thienvu Tran
*Assistant Examiner* — Kevin J Comber (57) ABSTRACT

An input line selector system provided to selectively connect one of two input power lines is configured with a single switch provided in series with each of the input power lines, the connection between the switches being made such that it prevents reverse flow of current in the event that the switches are OFF. A smart, simple and precisely operating automatic line selector is provided to control the operation of the two switches. The line selector system configuration is simple and implements only two switches and can be applied to a linear charger or switching charger application with addition of one or two switches respectively, thereby providing a simple, efficient and cost effective system.

16 Claims, 10 Drawing Sheets

INPUT LINE SELECTOR SYSTEM FOR BATTERY CHARGERS

FIELD

The present disclosure relates to input line selectors. In particular, the present disclosure relates to input line selectors for dual input chargers.

DEFINITIONS

The expression 'current flow' used hereinafter in the specification refers to flow of current from any one of the two input power sources to an output.

The expression 'node' used hereinafter in the specification refers to but is not limited to a connection point or a redistribution point wherein at least two elements of a circuit meet.

The expression 'switch' used hereinafter in the specification refers to but is not limited to a transistor having at least three terminals.

The expression 'load' used hereinafter in the specification refers to a connected battery and/or other connected elements in a system.

The expression 'a first/fourth/seventh/tenth/thirteenth terminal', 'a second/fifth/eighth/eleventh/fourteenth terminal' and 'a third/sixth/ninth/twelfth/fifteenth terminal' when used in association with an NPN Bipolar Junction Transistors (BJTs) refers to the Emitter, the Collector and the Base respectively.

The expression 'a first/fourth/seventh/tenth/thirteenth terminal', 'a second/fifth/eighth/eleventh/fourteenth terminal' and 'a third/sixth/ninth/twelfth/fifteenth terminal' when used in association with a PNP Bipolar Junction Transistors (BJTs) refers to the Collector, the Emitter and the Base respectively.

The expression 'a first/fourth/seventh/tenth/thirteenth terminal', 'a second/fifth/eighth/eleventh/fourteenth terminal' and 'a third/sixth/ninth/twelfth/fifteenth terminal' when used in association with an N type Metal Oxide Semiconductor Field-Effect Transistors (MOSFETs) refers to the Source, the Drain and the Gate respectively.

The expression 'a first/fourth/seventh/tenth/thirteenth terminal', 'a second/fifth/eighth/eleventh/fourteenth terminal' and 'a third/sixth/ninth/twelfth/fifteenth terminal' when used in association with a P type Metal Oxide Semiconductor Field-Effect Transistors (MOSFETs) refers to the Drain, the Source and the Gate respectively.

The expression 'under voltage lockout level' used hereinafter in the specification refers to but is not limited to a pre-determined operational voltage level.

The expression 'source-drain-drain-source configuration' used hereinafter in the specification refers to two nMOSFETS connected in series to each other such that the drain of a first nMOSFET is connected to the drain of a second nMOSFET.

These definitions are in addition to those expressed in the art.

BACKGROUND

As notebooks, cell phones, hand held devices and the like continue to grow in popularity, so does the need for power supplies to these devices. To gratify this need, these devices are provided either with single input plug-in power adapters or dual input chargers that manage charging of batteries from two power sources, typically via a wall adapter and a USB interface. A charger typically charges a battery and at the same time generates regulated power for use within a system. Numerous battery charger architectures have been developed in recent years. Normally, a charger system is a step-down converter that drives a lower output load like a battery using a higher input supply.

A dual input charger known in the art comprises load switch integrated circuits (ICs) implementing transistors, typically, MOSFETs. MOSFETs usually include an inherent parasitic diode i.e. a body diode, which is formed between the drain and the source of the MOSFET. To receive power from the two input sources, dual input chargers use two load switch ICs, one each at the receiving end of each of the input power sources. Each of the load switch ICs comprises a series combination of two nMOSFETs in a source-drain-drain-source configuration. The load switch ICs are provided with an 'enable' signal to turn ON a desired load switch IC. The load switch ICs, as described herein above, when used in combination with a switching/linear charger find applications in dual input single output chargers. A switching/linear charger further comprises a series combination of two nMOSFETs in a source-drain-drain-source configuration.

Therefore conventional dual input chargers providing a single output require at least six or seven nMOSFETs for proper functioning, thereby increasing the cost and making the system complex because of the need for additional circuitry for driving the large number of connected switches in an optimum manner.

One of the products of Texas Instruments, BQ24160 (dual input switching charger) implements the aforementioned architecture to receive input from two power sources and provides a single output. The system comprises a pair of load switches, one connected to each input power source. Each load switch further comprises a pair of nMOSFET switches connected to each other in a source-drain-drain-source configuration. The load switches are connected to a linear/switching charger that also implements a series combination of two nMOSFETs in the source-drain-drain-source configuration. In a single input linear charger application, the configuration of a product of Texas Instruments, BQ25040 involves use of six nMOSFET switches (4 switches in operation during a charging mode) and in a single input switching charger application, the configuration of a product of Texas Instruments, BQ24150 would involve use of seven nMOSFET switches (5 switches in operation during a charging mode) for implementing a dual input single output functionality. The increased number of switches and additional control signals for selecting a specific load switch increases the complexity of the circuit. Moreover, an increased number of series connections of nMOSFETs increases conduction losses, thereby reducing efficiency and increasing cost.

Another endeavor towards providing a dual input single output charger is disclosed in U.S. Pat. No. 7,759,907B2 wherein the system receives power from two input power sources and is provided with a source selector circuit to logically select one of the two power sources. The source selector circuit further comprises two circuits implementing a combination of isolation diodes and bypass transistors, each of the circuits being associated with one input power source. These bypass transistors are p-type transistors, that together with pull up resistors and isolation diodes perform selection of an input power source and connect the selected input power source to the output. The aforementioned source selector circuit by itself makes use of four bypass transistors, isolation diodes and pull up resistors. When used in a charging application, the circuit involves further components that add to conduction losses and accordingly the cost of the system increases.

Hence, there is felt a need for an improvised charging circuit arrangement which has improved efficiency, is less complex and results in a cost effective system.

OBJECTS

Some of the objects of the present disclosure aimed to ameliorate one or more problems of the prior art or to at least provide a useful alternative are described herein below:

An object of the present disclosure is to provide an efficient input line selector associated with a dual input battery charger.

Another object of the present disclosure is to provide simple control of elements in an input line selector associated with a dual input battery charger.

Still another object of the present disclosure is to provide an automatic line selector that operates without any external signals for controlling the switches constituting the selector.

Yet another object of the present disclosure is to provide an input line selector associated with a dual input battery charger having a configuration that involves relatively lesser number of elements.

Still another object of the present disclosure is to reduce conduction losses in a dual input battery charger.

One more object of the present disclosure is to provide a cost effective dual input battery charger.

An additional object of the present disclosure is to provide a compact dual input battery charger.

Other objects and advantages of the present disclosure will be more apparent from the following description when read in conjunction with the accompanying figures, which are not intended to limit the scope of the present disclosure.

SUMMARY

In accordance with the present disclosure, there is provided an input line selector system adapted to selectively connect one of a first input power line and a second input power line to a common node, characterized in that the system comprises:
- a first switch adapted to selectively provide current flow from the first input power line to the node;
- a second switch adapted to selectively provide current flow from the second input power line to the node;
- an automatic line selector connected to the first switch and the second switch, the automatic line selector adapted to toggle either of the first switch or the second switch between an operative configuration and an inoperative configuration based on a pre-determined selection logic and depending on voltage level of at least one of the first input power line and the second input power line being greater than a pre-defined under voltage lockout level.

Typically, in accordance with the present disclosure, the first switch and the second switch are transistors selected from the group consisting of Metal Oxide Semiconductor Field-Effect Transistors (MOSFETs) and Bipolar Junction Transistors (BJTs).

Preferably, the first switch comprises at least a first terminal, a second terminal and a third terminal, the first terminal being connected to the first input power line; the second switch comprises at least a fourth terminal, a fifth terminal and a sixth terminal, the fourth terminal being connected to the second input power line, the second terminal and the fifth terminal being connected to the node.

In accordance with the present disclosure, in the event that the first switch and the second switch are NPN Bipolar Junction Transistors (BJTs), the first terminal and the fourth terminal are the Emitter, the second terminal and the fifth terminal are the Collector and the third terminal and the sixth terminal are the Base of the transistor constituting said first switch and said second switch.

In accordance with the present disclosure, in the event that the first switch and the second switch are PNP Bipolar Junction Transistors (BJTs), the first terminal and the fourth terminal are the Collector, the second terminal and the fifth terminal are the Emitter and the third terminal and the sixth terminal are the Base of the transistor constituting said first switch and said second switch.

In accordance with the present disclosure, in the event that the first switch and the second switch are N type Metal Oxide Semiconductor Field-Effect Transistors (MOSFETs), the first terminal and the fourth terminal are the Source, the second terminal and the fifth terminal are the Drain and the third terminal and the sixth terminal are the Gate of the transistor constituting said first switch and said second switch.

In accordance with the present disclosure, in the event that the first switch and the second switch are P type Metal Oxide Semiconductor Field-Effect Transistors (MOSFETs), the first terminal and the fourth terminal are the Drain, the second terminal and the fifth terminal are the Source and the third terminal and the sixth terminal are the Gate of the transistor constituting said first switch and said second switch.

The automatic line selector as described herein above typically includes:
- a first voltage divider comprising a first pair of resistors adapted to be connected to the first input power line and generate a first sensed voltage;
- a second voltage divider comprising a second pair of resistors adapted to be connected to the second input power line and generate a second sensed voltage;
- a comparator adapted to receive the first sensed voltage and the second voltage and generate an output signal; and
- a driver adapted to receive the output signal and provide a pre-determined voltage to either the third terminal or the sixth terminal.

Additionally, the line selector as described herein above in accordance with the present disclosure finds application in a linear charger wherein the linear charger further comprises a third switch operatively coupled between the node and the load, the third switch having at least a seventh terminal, an eighth terminal and a ninth terminal, the seventh terminal being connected to the load, the eighth terminal being connected to the node and the ninth terminal being coupled to a driver.

Furthermore, the line selector as described herein above in accordance with the present disclosure finds application in a switching charger wherein the switching charger further comprises a fourth switch and a fifth switch operatively coupled between the node and the load, the fourth switch having a tenth terminal, an eleventh terminal and a twelfth terminal and the fifth switch having a thirteenth terminal, a fourteenth terminal and a fifteenth terminal, the tenth terminal and the fourteenth terminal being connected to a switching node, the eleventh terminal being connected to the node, the thirteen terminal being connected to ground and the twelfth terminal and the fifteenth terminal being coupled to a Pulse Width Modulation (PWM) driver.

The system described in accordance with the present disclosure can be implemented using at least one of discrete components, integrated circuits (ICs) and hybrid integrated circuits.

In accordance with the present disclosure, there is provided a method of selectively connecting and providing current flow from either one of a first input power line or a second input power line to a common node, the method comprising the steps of:

provide a first switch having a first terminal, a second terminal and a third terminal between the first input power line and the node;

connecting the first terminal to the first input power line and the second terminal to the node;

providing a second switch having a fourth terminal, a fifth terminal and a sixth terminal between the second input power line and the node;

connecting the fourth terminal to the second input power line and the fifth terminal to the node;

toggling either of the first switch or the second switch between an operative configuration and an inoperative configuration based on a pre-determined selection logic and depending on voltage level of at least one of the first input power line and the second input power line being greater than a pre-defined under voltage lockout level;

generating a first sensed voltage corresponding to the first input power line;

generating a second sensed voltage corresponding to the second input power line;

comparing the first sensed voltage and the second sensed voltage and generating an output signal; and driving either the third terminal or the sixth terminal based on the output signal to connect either the first input power line or the second input power line having a higher sensed voltage.

The method in accordance with the present invention, as described herein above, further comprises the steps of:

providing a third switch having a seventh terminal, an eighth terminal and a ninth terminal, between the first input power line and a connected load;

connecting the seventh terminal to the load;

connecting the eighth terminal to the node;

driving the ninth terminal suitably to regulate charging current and charging voltage to the load, when applied to a linear charger.

The method in accordance with the present invention, as described herein above, further comprises the steps of:

providing a fourth switch having a tenth terminal, a eleventh terminal and a twelfth terminal and a fifth switch having a thirteenth terminal, a fourteenth terminal and a fifteenth terminal, between the node and a switching node;

connecting the eleventh terminal to the node;

connecting the thirteenth terminal to ground;

connecting the tenth terminal and the fourteenth terminal to the load; and driving the twelfth terminal and the fifteenth terminal suitably to regulate charging current and charging voltage to the switching node, when applied to a switching charger.

The pre-determined selection logic referred to in the method described herein above comprises the steps of:

determining hysteresis voltage and an offset voltage such that the offset voltage including hysteresis voltage is lower than the forward voltage of parasitic body diodes of the first switch and the second switch; and subtracting said hysteresis voltage from said offset voltage applied to at least one of the first sensed voltage and the second sensed voltage to determine a high priority input line to be selected from the first sensed voltage and the second sensed voltage.

BRIEF DESCRIPTION OF THE ACCOMPANYING DRAWINGS

The input line selector and associated battery charger in accordance with the present disclosure will now be described in relation to the accompanying drawings, in which.

Corresponding reference numerals/indicia indicate corresponding parts throughout the several views of the accompanying drawings.

DETAILED DESCRIPTION

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

Figure 1:
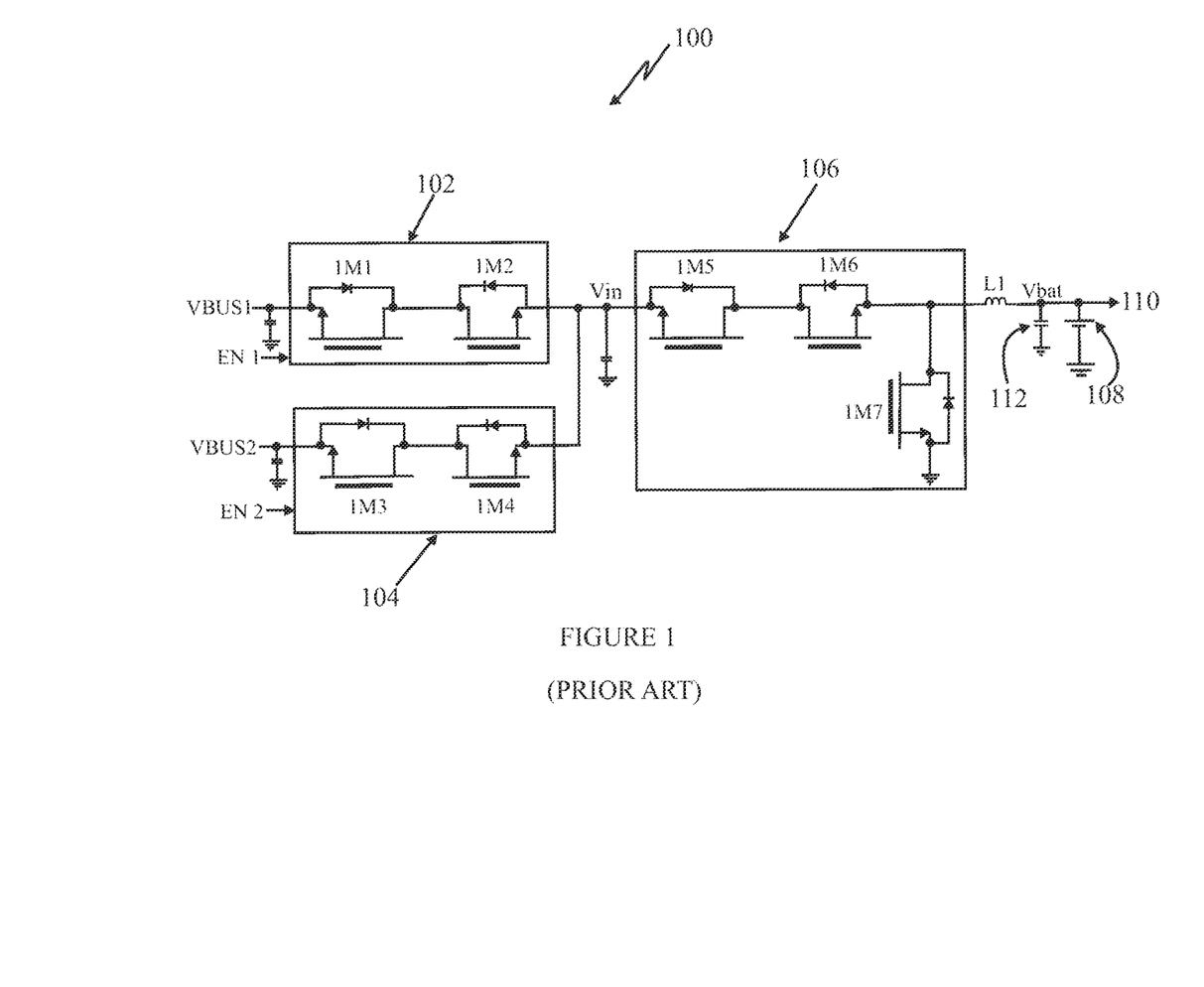
FIG. 1 illustrates a conventional input selector system and an associated battery charger.

FIG. 1 illustrates a conventional input selector system and an associated battery charger. As illustrated in the figure, a system (100) comprises a combination of two load switch Integrated Circuits (ICs) and an associated battery charger, thus illustrating a dual input single output charger application. The system (100) receives power from two input power lines VBUS1 and VBUS2 which are connected to a first load switch IC (102) and a second load switch IC (104) respectively. The first load switch IC (102) comprises a series connection of two transistors, typically nMOSFETs, 1M1 and 1M2 respectively in a source-drain-drain-source configuration. Similarly, the second load switch IC (104) comprises a series connection of two transistors, 1M3 and 1M4 respectively in the source-drain-drain-source configuration. The load switches ICs (102) and (104) are each coupled in series with nMOSFETs 1M5 and 1M6 of a charger IC (106), wherein the switches 1M5 and 1M6 are connected in a source-drain-drain-source configuration. The nMOSFET 1M7 along with the nMOSFET 1M6 act as a regulator and perform regulation of charging current and charging voltage through an inductor L1 and a capacitor (112), the output being provided to a load comprising battery (108) and/or to other connected elements (110) of the system (100).

When the system (100) is connected to the two input power lines VBUS1 and VBUS2, enable signals EN1 and EN2 accordingly enable one of the load switch ICs (102, 104) to receive input power from one of the available input power lines VBUS1 and VBU2 respectively. When the appropriate load switch IC (102, 104) is enabled, input power is received by the series combination of nMOSFETs of the selected load switch IC (102, 104). Typically, if the voltage on the gate of an nMOSFET of the load switch is higher than the threshold voltage of the gate of the nMOSFET, then a conducting channel is created between the source and the drain and the enabled nMOSFET starts conducting. Both the load switch ICs (102, 104) connect input power lines VBUS1 and VBUS2 to a common node Vin and thus supply power to the charger IC (106). Upon selection of an input power line, the nMOSFETs 1M5 and 1M6 start conducting in a similar way as the nMOSFETs of the load switch ICs (102 and 104). The nMOSFET 1M7 regulates the input power with the help of the inductor L1 and a capacitor (112) acting as a filter and blocking the flow of alternating current (AC). The regulated voltage available at the node Vbat is then supplied either to the battery (108) and/or to other connected elements (110) of the system (100).

When the nMOSFETs are in an OFF state, there is a possibility of reverse current flow from the battery (108). The source-drain-drain-source configuration of the series connected nMOSFETs blocks the reverse current and isolates the input power sources VBUS1 and VBUS2 respectively from the node Vin and also provides isolation between the nodes Vin and Vbat. However, repeated use of series configuration of nMOSFETs tends to increase conduction losses, thereby reducing the efficiency of the charger system.

Figure 1A:
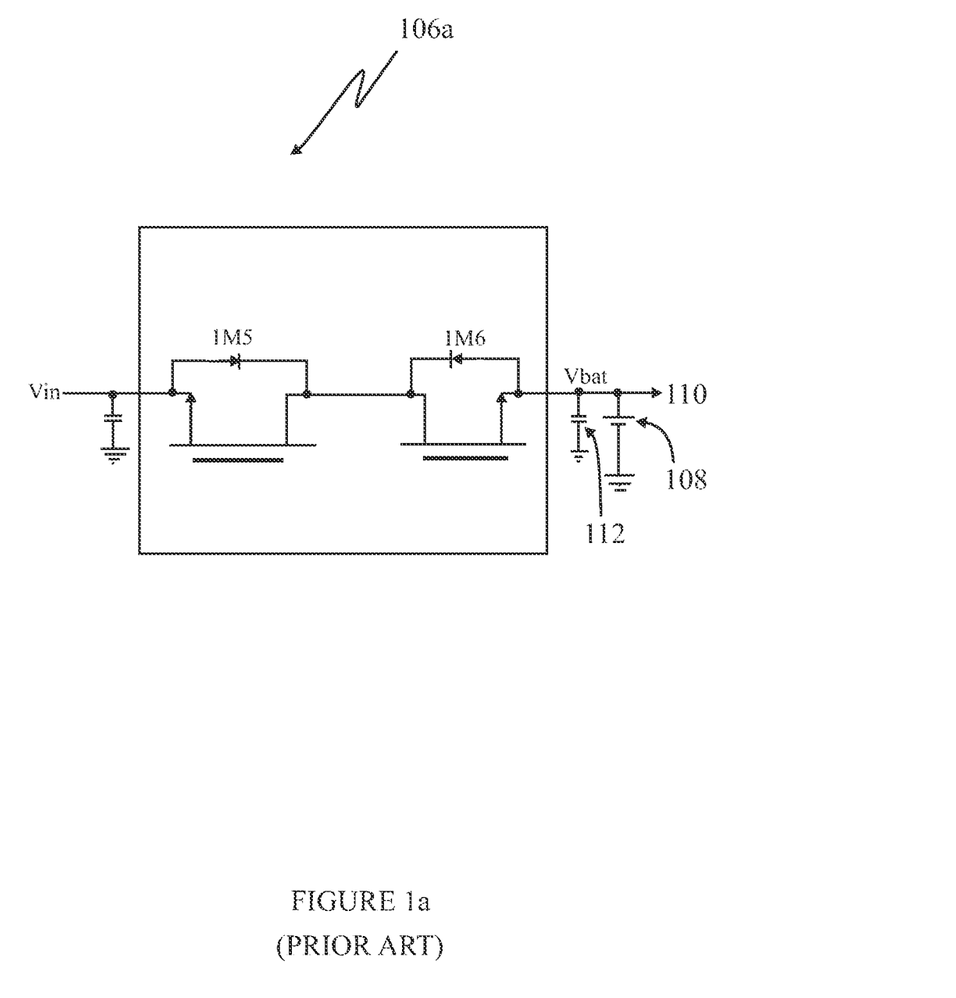
FIG. 1a illustrates a linear charger associated with the conventional battery charger of FIG. 1.

The charger IC (106) of FIG. 1 represents a linear charger IC (106a) and a switching charger IC (106b). FIG. 1a illustrates a linear charger associated with the conventional battery charger of FIG. 1. The figure shows a linear charger IC (106a) comprising a first switch 1M5 and a second switch 1M6 connected in series in source-drain-drain-source configuration between the node Vin and the node Vbat. During normal operation, the first switch 1M5 always turns ON and the second switch 1M6 serves to regulate battery voltage at the node Vbat linearly. In a condition when input voltage at the node Vin falls below the battery voltage at the node Vbat and consequently all switches are turned OFF, the first switch 1M5 blocks the undesired reverse current.

Figure 1B:
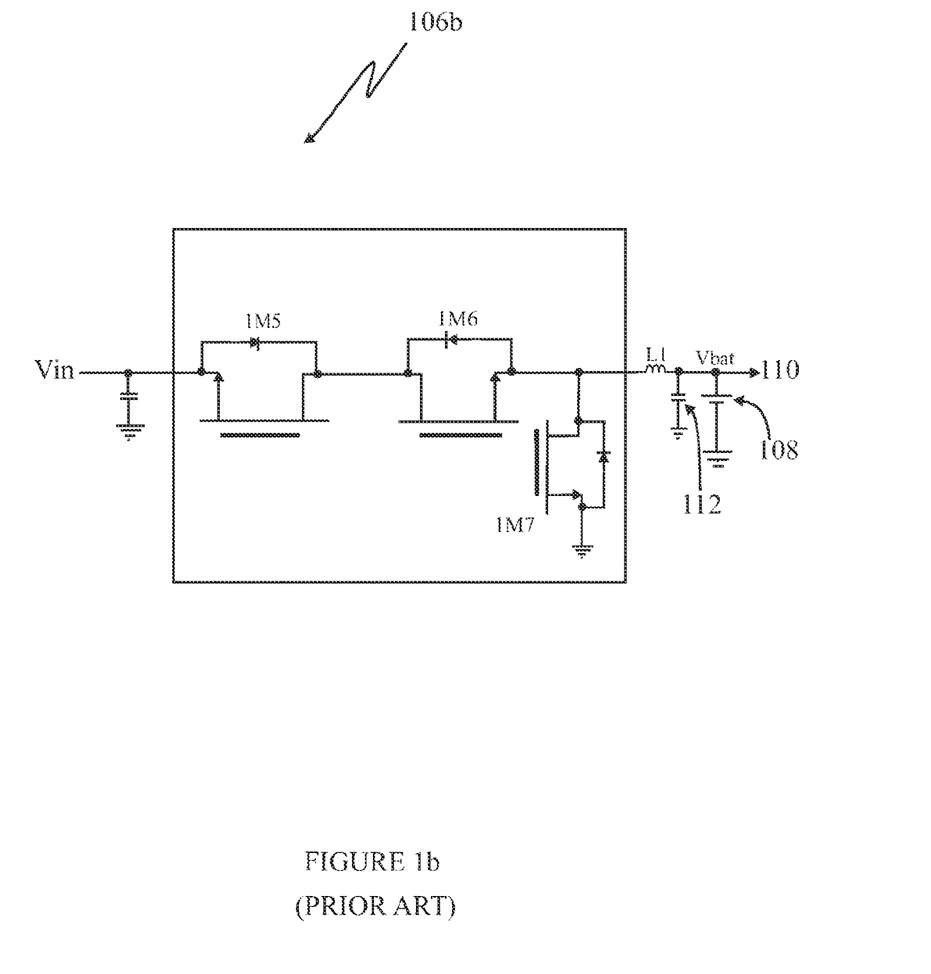
FIG. 1b illustrates a switching charger associated with the conventional battery charger of FIG. 1.

FIG. 1b illustrates a switching charger IC associated with the conventional battery charger of FIG. 1. The switching charger IC (106b) comprises three switches operatively connected between the node Vin and the node Vbat. The switch 1M5 always turns ON during normal operation. It also blocks the current from the node Vbat to the node Vin in case voltage at the node Vin is lower than the battery voltage at the node Vbat and consequently all switches are turned OFF. The switches 1M6 and 1M7 switch ON/OFF accordingly and the output voltage at the node Vbat is determined according to the ON time of the switches 1M6 and 1M7. The output voltage at the node Vbat is regulated through an inductor L1 and a capacitor (not particularly referenced). As the switch 1M6 turns ON and the switch 1M7 turns OFF, energy is stored by the inductor L1 and when the switch 1M7 turns ON and switch 1M6 turns OFF, power is delivered by the inductor L1 to the node Vbat. The inductor L1 and the capacitor (112) act as a low pass filter and provide a stable DC voltage. The charger acts as a buck converter from the point of view of voltage regulation.

Thus conventional charger applications configured as illustrated in FIGS. 1, 1a and 1b necessarily require at least 4 switches to provide isolation between the dual input power sources and the output and further at least 2 additional switches for the charger functionality.

Figure 2A:
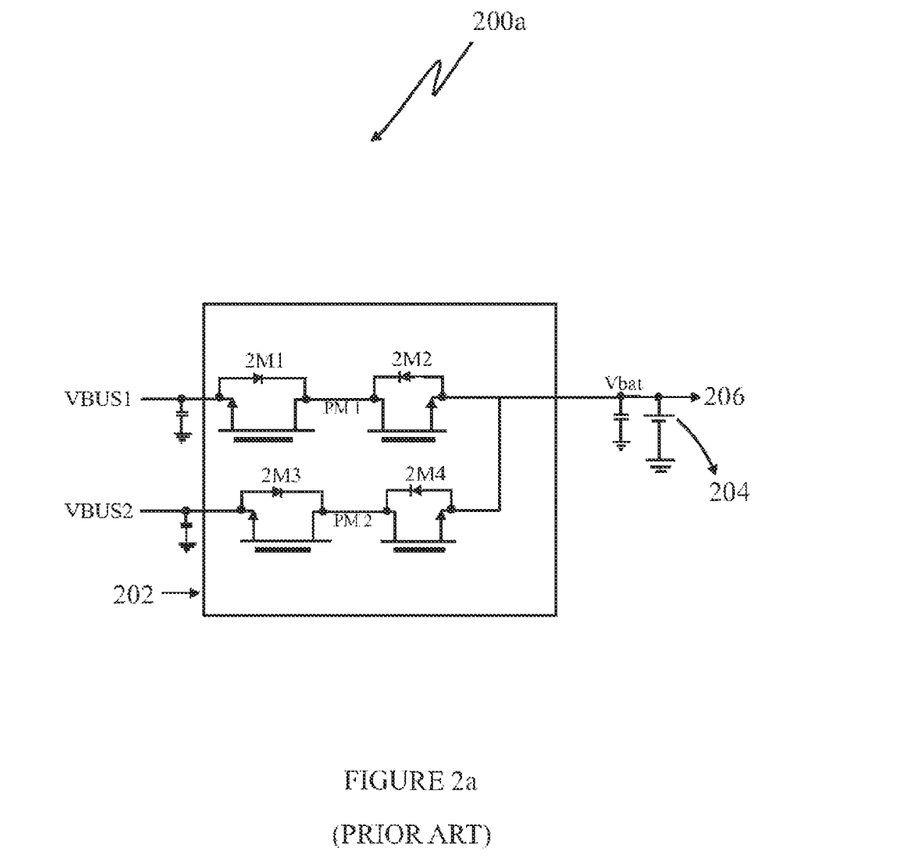
FIG. 2a illustrates an alternative linear charger known in the art.

FIG. 2a illustrates an alternative linear charger IC known in the art. A charger (200a) with two input power lines VBUS1 and VBUS2 comprises a series combination of switches 2M1 and 2M2 connected in a source-drain-drain-source configuration to the input power line VBUS1 and switches 2M3 and 2M4 connected in series in the source-drain-drain-source configuration to the input power line VBUS2 respectively. An input power line VBUS1 or VBUS2 is selected based on an 'enable' signal (202) controlled by an external controller. The switches 2M1 and 2M2 conduct when VBUS1 is selected. The switches 2M3 and 2M4 conduct when VBUS2 is selected. The switch 2M2 or 2M4 regulates the charging current and charging voltage supplied to a battery (204) or to elements (206) of the system (200a). When all switches are turned off, the charger IC (200a) isolates the battery at the node Vbat from the input power lines VBUS1 and VBUS2.

Figure 2B:
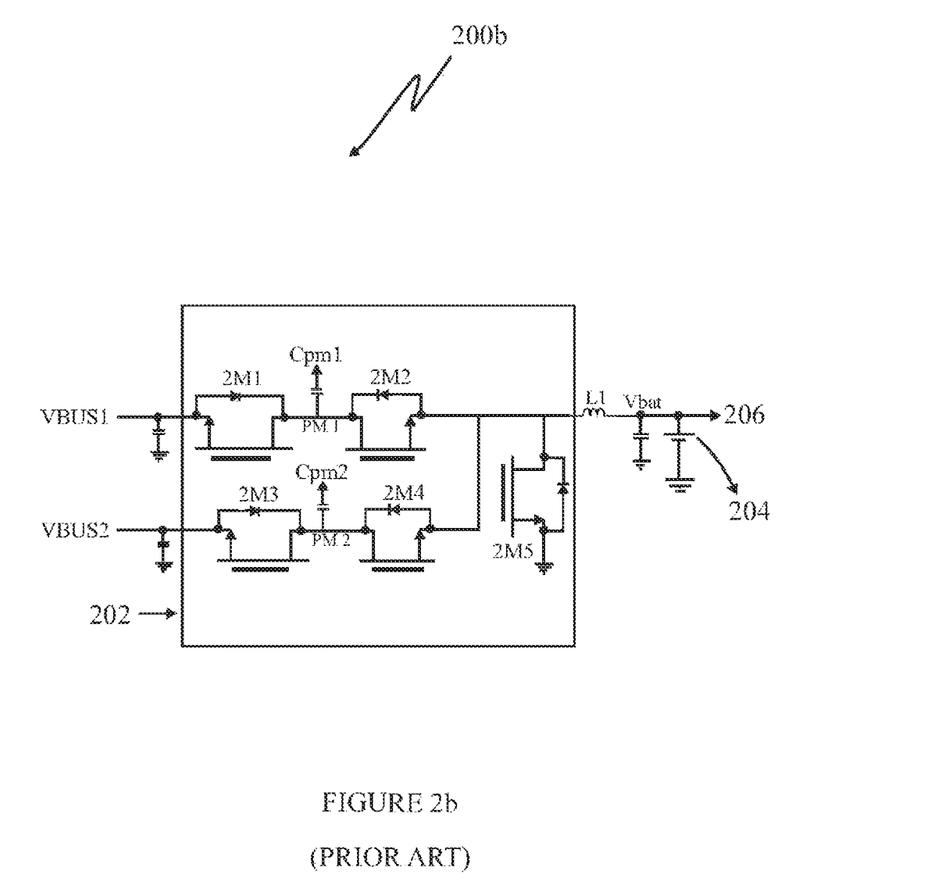
FIG. 2b illustrates an alternative switching charger known in the art.

FIG. 2b illustrates an alternative switching charger IC known in the art. A charger IC (200b) with two input power lines VBUS1 and VBUS2 comprises a series combination of switches 2M1 and 2M2 connected in a source-drain-drain-source configuration to the input power line VBUS1 and switches 2M3 and 2M4 connected in series in a source-draindrain-source configuration to the input power line VBUS2 respectively. An input power line VBUS1 or VBUS2 is selected based on an 'enable' signal (202) controlled by an external controller. The switches 2M1 and 2M2 conduct when VBUS1 is selected. The switches 2M3 and 2M4 conduct when VBUS2 is selected. The switches 2M5 along with 2M2 2M4 regulate the output voltage supplied to a battery (204) or to elements (206) of the system (200b). Bypass capacitors Cpm1 and Cpm2 are provided with each of the combination of switches to ensure stable operation of the charger. When all switches are turned off, the charger IC (200b) isolates the battery at the node Vbat from the input power lines VBUS1 and VBUS2.

Thus conventional charger applications configured as illustrated in FIGS. 2a and 2b necessarily require at least 4-5 switches to provide isolation between the dual input power sources and the output and to cater to the charger functionality.

Furthermore, conventional charger applications configured as illustrated in FIGS. 1, 1a, 1b, 2a and 2b necessarily require additional circuits (mechanically hardwired or electronically controlled) to sense voltages at the input power lines and select the appropriate input power line. Thus a need for a larger number of switches, added circuitry and complexity involved makes the systems known in the art expensive and inefficient.

Figure 3:
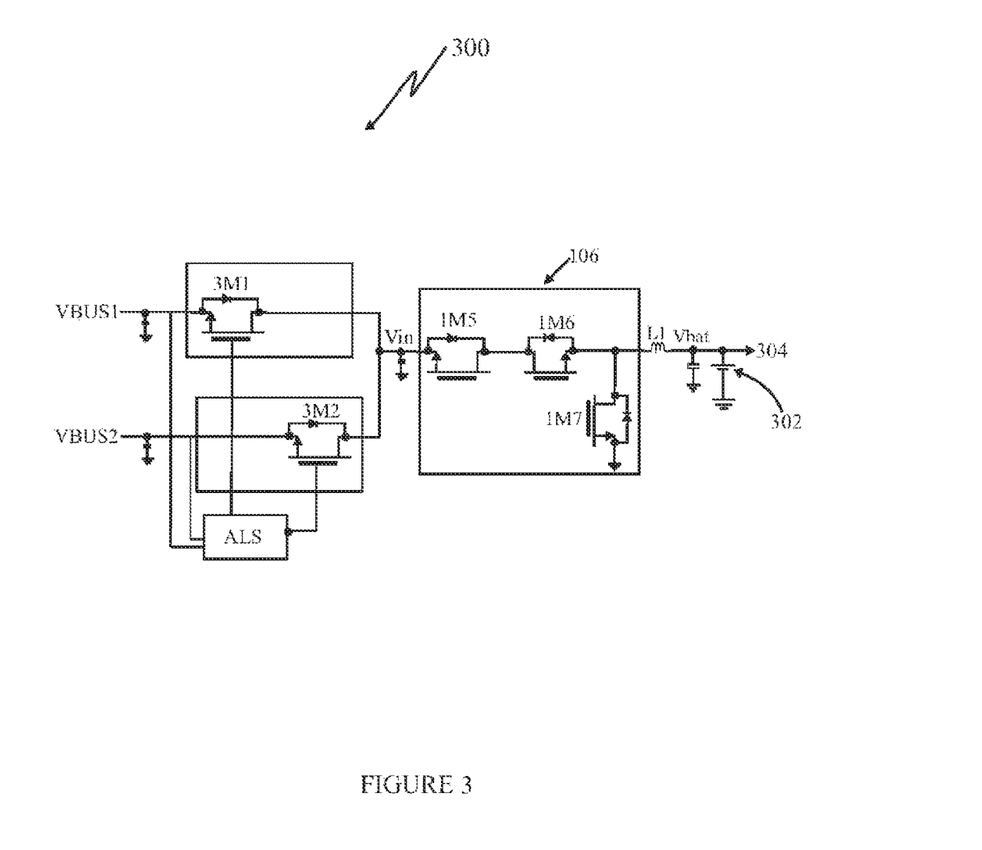
FIG. 3 illustrates an input line selector and an associated battery charger in accordance with an embodiment of the present disclosure.

FIG. 3 illustrates an input line selector and associated battery charger in accordance with an embodiment of the present disclosure. The system (300) comprises two switches 3M1 and 3M2 connected to input power lines VBUS1 and VBUS2 respectively. The switches 3M1 and 3M2 are transistors, typically BJTs or MOSFETs. The description of the embodiments of the present disclosure is provided herein below with reference to nMOSFETs. However, the embodiments are applicable to other transistors including NPN Bipolar Junction Transistors (BJTs), PNP Bipolar Junction Transistors (BJTs), N type Metal Oxide Semiconductor Field-Effect Transistors (MOSFETs), P type Metal Oxide Semiconductor Field-Effect Transistors (MOSFETs) and the like.

The switches 3M1 and 3M2 are connected to each other in a source-drain-drain-source configuration to provide isolation between the input power lines VBUS1 and VBUS2 when the switches are turned OFF and permit current flow to the node Vbat, thereby preventing reverse current flow from the node Vbat to the input power lines VBUS1 and VBUS2 when the switches are turned OFF. An automatic line selector ALS with gate drivers is provided to control the operation of the switches 3M1 and 3M2 based on a pre-determined logic. The automatic line selector ALS with gate drivers selects one of the input power lines VBUS1 and VBUS2 and accordingly drives the gate of the corresponding switch (3M1 or 3M2) by providing a pre-determined voltage greater than the threshold voltage of the gate, thereby turning the switch ON. The drain terminals of the switches 3M1 and 3M2 are connected to a common node Vin which is further connected to a conventional charger (106) comprising two/three switches 1M5, 1M6 and 1M7. The conventional charger (106) has been described herein above as a linear charger (106a) and as a switching charger (106b) with reference to FIG. 1a and FIG. 1b respectively.

The system (300) thus configured in accordance with the present disclosure obviates the need for four switches to isolate the input power lines from the output as illustrated and described in the conventional system (100) of FIG. 1. The system (100) is thus effectively modified to system (300) of the present disclosure by providing an input line selector system that includes half the number of switches, when compared to prior art, and an effectively configured automatic line selector and gate driver, thereby making the system (300) simple, efficient and cost effective.

Figure 4:
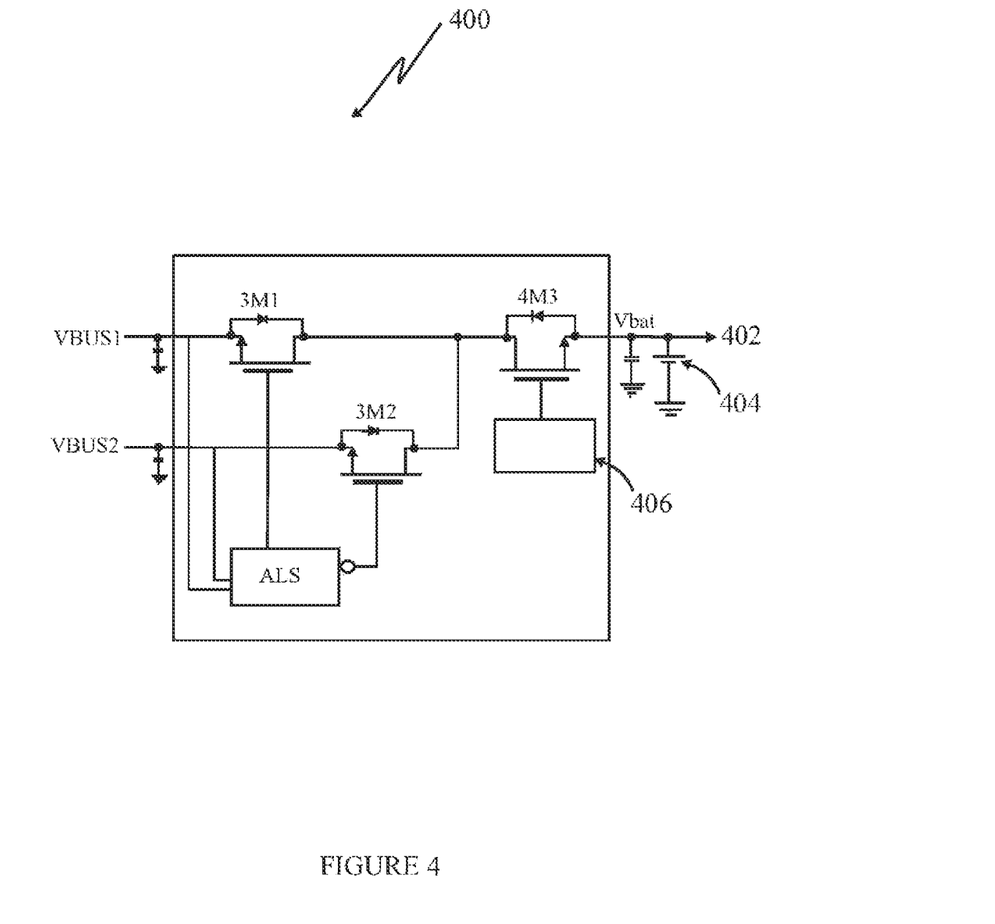
FIG. 4 illustrates a linear charger for a battery in accordance with an embodiment of the present disclosure.

FIG. 4 illustrates a dual input single output linear charger for a battery in accordance with an embodiment of the present disclosure. A linear charger (400) comprises an automatic line selector ALS with gate drivers that connect one of the two input power lines VBUS1 and VBUS2 to a node Vbat via a corresponding switch 3M1 or 3M2. The automatic line selector ALS with gate drivers drives the gate of the corresponding switch 3M1 or 3M2 to permit current flow to a switch 4M3 which operates linearly as a regulator, thereby regulating the charging voltage and charging current of the battery (404) or other elements (402) of the system. For instance, when the input power line VBUS1 is selected by the automatic line selector ALS with gate drivers, the switch 3M1 turns ON and the switch 3M2 turns OFF. The switch 4M3 regulates its output at the node Vbat thus controlling the charging current and charging voltage of the battery (404) or the other elements (402).

The switch 4M3 is controlled by a gate driver (406). The switch 4M3 provides isolation between the input power lines (VBUS1, VBUS2) and the node (Vbat) by means of a source-drain-drain-source configuration provided between the switch 4M3 and the connected switches 3M1 and 3M2, when the switches are turned OFF. For instance, in the event that the switches 3M1, 3M2 and 4M3 are turned OFF, the source-drain-drain-source configurations of switches 3M1 and 4M3 and also switches 3M2 and 4M3 prevent any reverse current flow from the battery (404).

Figure 5:
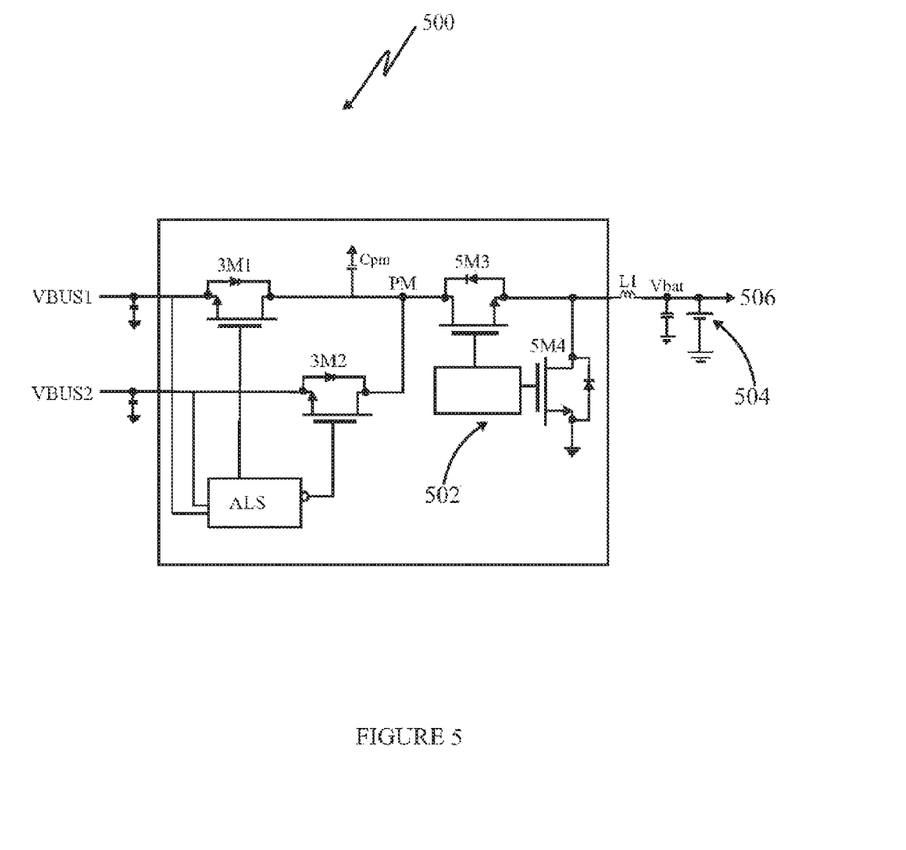
FIG. 5 illustrates a switching charger for a battery in accordance with an embodiment of the present disclosure.

FIG. 5 illustrates a dual input single output switching charger for a battery in accordance with an embodiment of the present disclosure. A charger (500) comprises switches 3M1, 3M2 and an automatic line selector ALS with gate drivers arranged in the same configuration as described in FIG. 4. A switch 5M3 provides isolation between the input power lines (VBUS1, VBUS2) and the node (Vbat) by means of a source-drain-drain-source configuration provided between the switch 5M3 and the connected switches 3M1 and 3M2. An additional switch 5M4 is provided to co-operate with the switch 5M3 to serve the functionality of a switching charger. The switches 5M4 and 5M3 are controlled by a Pulse Width Modulation driver (502) to regulate input power and provide switching output power. For instance, when the input power line VBUS1 is selected by the automatic line selector ALS with gate drivers, the switch 3M1 turns ON and the switch 3M2 turns OFF. The switches 5M3 and 5M4, whose conducting times are controlled by the Pulse Width Modulation driver (502), keep switching to regulate charging current and charging voltage at a switching node Vsw in conjunction with an energy storage component, an inductor L1 for charging a battery (504) connected at node Vbat or supplying power to other elements (506) of the system. Typically, a bypass capacitor Cpm is provided to ensure stable operation of the system (500).

Figure 6:
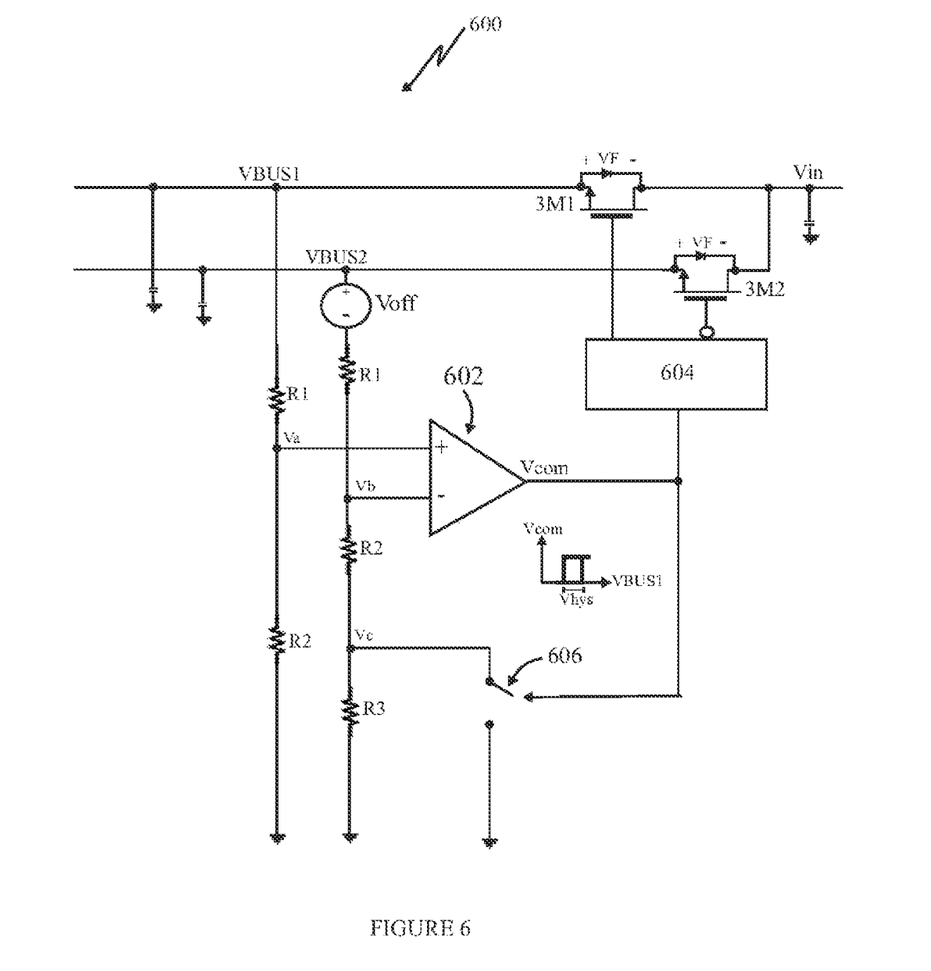
FIG. 6 illustrates an automatic line selector and a gate driver in accordance with an embodiment of the present disclosure.

FIG. 6 illustrates an automatic line selector and gate driver in accordance with an embodiment of the present disclosure. The arrangement (600) is configured to automatically select one of the two input power lines VBUS1 and VBUS2. The automatic line selector and gate driver toggles either of the switches associated with the input power lines between an operative configuration and an inoperative configuration based on a pre-determined selection logic and depending on the voltage level of at least one of the two input power lines being greater than a pre-defined under voltage lockout level. The voltage levels of each input power line VBUS1 and VBUS2 are sensed by an associated voltage divider comprising a pair of resistors. The voltages of each of the input power lines VBUS1 and VBUS2 are divided according to the resistor ratio of the resistive voltage divider comprising resistors R1, R2 for the input power line VBUS1 and resistors R1, R2, R3 for the input power line VBUS2. The sensed voltages at nodes Va and Vb associated with input power lines VBUS1 and VBUS2 respectively are the non-inverting and inverting inputs respectively to a comparator (602) that compares the two inputs and generates an output voltage Vcom. The comparator (602) is provided with a hysteresis voltage Vhys for stable operation and preventing flickering and undesired rapid switching in Vcom, due to noise between the two input power lines. The hysteresis voltage Vhys is provided by resistor R3 and a switch (606). When the switch (606) is in an OFF state, voltage at a node Vc is set by the ratio of R1+R2 and R3. When the switch (606) is in an ON state, the node Vc is connected to ground. A change in voltage at the node Vc results in a change in voltage at the node Vb, the inverting input of the comparator (602) and generates the required hysteresis voltage Vhys. The comparator (602) compares the inputs at nodes Va and Vb and the generated output voltage Vcom is provided to a gate driver (604) to drive the gate of one of the two nMOSFETs 3M1 and 3M2 accordingly. For instance, the gate driver (604) turns ON the nMOSFET 3M1 for high Vcom and turns OFF the nMOSFET 3M2. Similarly, for low Vcom, the nMOSFET 3M2 is turned ON and the nMOSFET 3M1 is turned OFF thereby making the switching of the two nMOSFETS dependent on the input voltages VBUS1 and VBUS2. The selected power line is thus connected to the linear/switching charger through the applicable switch.

Figure 7:
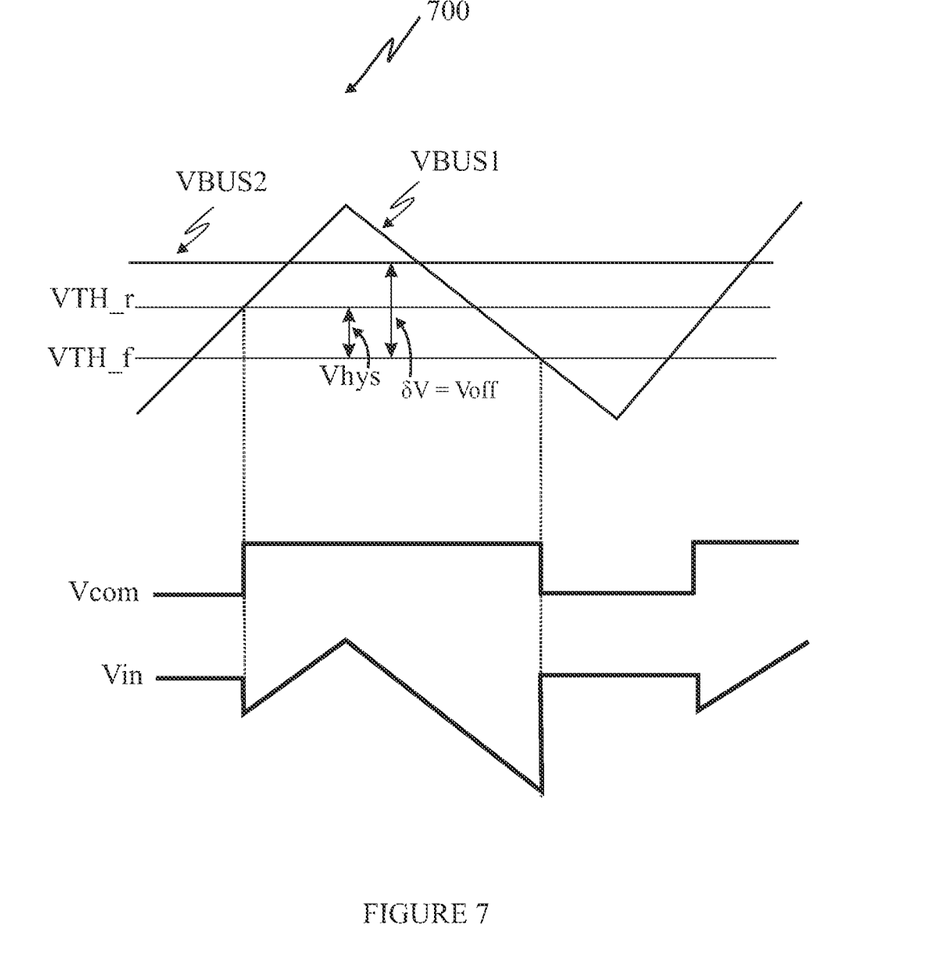
FIG. 7 illustrates an output waveform of the automatic line selector of FIG. 6.

FIG. 7 illustrates an output waveform of the automatic line selector of FIG. 6. VBUS1 and VBUS2 represent the voltage waveforms of the corresponding input power supplies, Vcom represents the output voltage of the comparator of FIG. 6 and Vin represents the voltage that is supplied to a linear/switching charger application. VTH_r represents the threshold voltage when VBUS1 rises and VTH_f represents the threshold voltage when VBUS1 falls. At VTH_r, the Vcom toggles from a low level to a higher level and vice versa on VTH_f.

It is essential that one of the two input power lines is predetermined to have a higher priority. For instance, in the event that the two input power lines are obtained via an AC mains adapter and a USB interface, the same input voltage level may be sensed at both the input lines. Even though there is a little hysteresis in the threshold voltage of the comparator, the comparator's output has a possibility to be unstable (unknown state) due to equal input voltage levels at the comparator's inputs. Furthermore, although the two inputs are at the same voltage level, their current driving capability may be different. For instance, an adapter has a higher current driving capability than a USB input. Therefore, the adapter input line is required to be attributed a higher priority in the event that the input lines have the same sensed voltage levels.

However, to select one of the two input power lines, an offset voltage Voff is added to the sensed voltage of any one of the two input power lines. For explanation, we assume herein that Voff is added to the sensed voltage of input power line VBUS2 of FIG. 6. Voff represents the added offset voltage (in series with the resistive voltage divider) to make the input power line VBUS1 a high priority line or a primary line in the event that the input lines have the same sensed voltage levels.

Due to the addition of Voff, VBUS1 is assigned a priority expressed by the condition $$VBUS2 - Voff < VBUS1 \leq VBUS2$$

which is supported by the following set of mathematical equations, considering that VBUS1=VBUS2 and Vcom goes to high level.

$$VTH\_r = (VBUS2 - Voff)\left(\frac{R2 + R3}{R1 + R2 + R3}\right)\left(\frac{R1 + R2}{R2}\right)$$

$$VTH\_f = (VBUS2 - Voff)\left(\frac{R2}{R1 + R2}\right)\left(\frac{R1 + R2}{R2}\right) = VBUS2 - Voff$$

The comparator (602) of FIG. 6 is required to be provided a hysteresis voltage Vhys for stable operation and to protect the comparator from acquiring an unknown status due to limited gain of comparator. The hysteresis voltage Vhys for the rising and falling threshold voltage of VBUS1 is as follows:

$$Vhys =$$

$$VTH\_r - VTH\_f = (VBUS2 - Voff)\left(\left(\frac{R2 + R3}{R1 + R2 + R3}\right)\left(\frac{R1 + R2}{R2}\right) - 1\right)$$

$$Vhys \sim (VBUS2 - Voff)\left(\frac{R3}{R2}\right), \text{ where } R1 + R2 \gg R3$$

The difference δV between VBUS2 and VTH_f is the same as the offset voltage Voff which is smaller than the forward voltage VF of parasitic body diodes of the nMOSFET switches 3M1 and 3M2 respectively to facilitate selection of the appropriate line. Therefore, in accordance with the present disclosure, $$\delta V = VBUS2 - VTH_f = Voff < VF$$

For instance, if VF=0.6V, δV=0.8V, VBUS1=VBUS2=5.4V, ALS selects VBUS1, which is a predetermined primary line. Accordingly, switch 3M1 turns ON and switch 3M2 turns OFF. At this time, if the VBUS1 power supply is removed, VBUS1 voltage goes down to VBUS2−VF=5.4V−0.6V=4.8V but switch 3M1 is still in an ON state and the switch 3M2 is in an OFF state because VBUS1 is not lower than VBUS2−δV. Therefore the output Vin, becomes 4.8V and the power loss occurs in 3M2 due to the body diode of 3M2. Assuming the worst case that the VBUS1 power supply is not removed but connected by 4.8V, VBUS2 and VBUS1 will be shorted and a huge short circuit current flows from VBUS2 to VBUS1 through the body diode of 3M2 and the Drain-Source resistance RDS (ON) of 3M1. Thus it is apparent that δV should be lower than the forward voltage of the body diode of the switches.

The system described in accordance with the present disclosure can be implemented using at least one of discrete components, integrated circuits (ICs) and hybrid integrated circuits.

Technical Advancements and Economic Significance

The technical advancements offered by the present disclosure include the realization of:
  an input line selector associated with a dual input battery charger having a configuration that involves relatively lesser number of elements;
  an efficient input line selector associated with a dual input battery charger;
  a simple control circuit for elements in an input line selector associated with a dual input battery charger;

an automatic line selector without any external signals to control switches;
reduced conduction losses in a dual input battery charger;
a cost effective dual input battery charger; and
a compact dual input battery charger.

The invention claimed is:

1. An input line selector system adapted to selectively connect one of a first input power line and a second input power line to a common node, characterized in that said system comprises:
   a first switch adapted to selectively provide current flow from said first input power line to said node;
   a second switch adapted to selectively provide current flow from said second input power line to said node;
   an automatic line selector connected to said first switch and said second switch, said automatic line selector adapted to toggle either of said first switch or said second switch between an operative configuration and an inoperative configuration based on a pre-determined selection logic and depending on voltage level of at least one of said first input power line and said second input power line being greater than a pre-defined under-voltage lockout level; and
   said automatic line selector comprises a comparator, generating an output voltage, adapted to receive a first sensed voltage indicative of voltage level of said first input power line, a second sensed voltage indicative of voltage level of said first input power line, and a hysteresis voltage for stable operation and prevention of flickering and undesired rapid switching in said output voltage.

2. The input line selector system as claimed in claim 1, wherein said automatic line selector further comprises means to prioritize selection between said first input power line and said second input power line.

3. The input line selector system as claimed in claim 2, wherein said means to prioritize selection between first input power line and said second input power line uses a mathematical expression VBUS2−Voff<VBUS1≤VBUS2, wherein Voff is an offset voltage level, VBUS1 is voltage level of said first input power line, and VBUS2 is voltage level of said second input power line.

4. The input line selector system as claimed in claim 1, wherein:
   said first switch comprises at least a first terminal, a second terminal and a third terminal, said first terminal being connected to said first input power line;
   said second switch comprises at least a fourth terminal, a fifth terminal and a sixth terminal, said fourth terminal being connected to said second input power line, said second terminal and said fifth terminal being connected to said node.

5. The input line selector system as claimed in claim 1, wherein said automatic line selector further comprises:
   a first voltage divider comprising a first pair of resistors adapted to be connected to said first input power line and generate said first sensed voltage;
   a second voltage divider comprising a second pair of resistors adapted to be connected to said second input power line and generate said second sensed voltage; and
   a driver adapted to receive said output signal and provide a pre-determined voltage to either said third terminal or said sixth terminal.

6. The input line selector system as claimed in claim 1, wherein said first switch and said second switch are transistors selected from the group consisting of Metal Oxide Semiconductor Field-Effect Transistors (MOSFETs) and Bipolar Junction Transistors (BJTs).

7. The input line selector system as claimed in claim 1, wherein said first switch and said second switch are NPN Bipolar Junction Transistors (BJTs) with said first terminal and said fourth terminal being the Emitter, said second terminal and said fifth terminal being the Collector and said third terminal and said sixth terminal being the Base of the transistor constituting said first switch and said second switch.

8. The input line selector system as claimed in claim 1, wherein said first switch and said second switch are PNP Bipolar Junction Transistors (BJTs) with said first terminal and said fourth terminal being the Collector, said second terminal and said fifth terminal being the Emitter and said third terminal and said sixth terminal being the Base of the transistor constituting said first switch and said second switch.

9. The input line selector system as claimed in claim 1, wherein said first switch and said second switch are N type Metal Oxide Semiconductor Field-Effect Transistors (MOSFETs) with said first terminal and said fourth terminal being the Source, said second terminal and said fifth terminal being the Drain and said third terminal and said sixth terminal being the Gate of the transistor constituting said first switch and said second switch.

10. The input line selector system as claimed in claim 1, wherein said first switch and said second switch are P type Metal Oxide Semiconductor Field-Effect Transistors (MOSFETs) with said first terminal and said fourth terminal being the Drain, said second terminal and said fifth terminal being the Source and said third terminal and said sixth terminal being the Gate of the transistor constituting said first switch and said second switch.

11. A linear charger connected to a load, said linear charger comprising the input line selector system as claimed in claim 1, said linear charger further comprising a third switch operatively coupled between said node and the load, said third switch having at least a seventh terminal, an eighth terminal and a ninth terminal, said seventh terminal being connected to the load, said eighth terminal being connected to said node and said ninth terminal being coupled to a driver.

12. A switching charger connected to a load, said switching charger comprising the input line selector system as claimed in claim 1, said switching charger further comprising a fourth switch and a fifth switch operatively coupled between said node and the load, said fourth switch having a tenth terminal, an eleventh terminal and a twelfth terminal and said fifth switch having a thirteenth terminal, a fourteenth terminal and a fifteenth terminal, said tenth terminal and said fourteenth terminal being connected to a switching node, said eleventh terminal being connected to said node, the thirteen terminal being connected to ground and said twelfth terminal and said fifteenth terminal being coupled to a Pulse Width Modulation (PWM) driver.

13. The input line selector system as claimed in claim 1, wherein said system comprises at least one of discrete components, integrated circuits (ICs) and hybrid integrated circuits.

14. A method of selectively connecting and providing current flow from either one of a first input power line or a second input power line to a common node, said method comprising the steps of:
   providing a first switch having a first terminal, a second terminal and a third terminal between said first input power line and said node;

connecting said first terminal to said first input power line and said second terminal to said node;

providing a second switch having a fourth terminal, a fifth terminal and a sixth terminal between said second input power line and said node;

connecting said fourth terminal to said second input power line and said fifth terminal to said node;

toggling either of said first switch or said second switch between an operative configuration and an inoperative configuration based on a pre-determined selection logic and depending on voltage level of at least one of said first input power line and said second input power line being greater than a pre-defined under-voltage lockout level, said pre-determined selection logic comprising the steps of:

determining a hysteresis voltage and an offset voltage such that said offset voltage including said hysteresis voltage is lower than the forward voltage of parasitic body diodes of said first switch and said second switch; and     subtracting said hysteresis voltage from said offset voltage applied to at least one of said first sensed voltage and said second sensed voltage to determine a high priority input line to be selected from said first sensed voltage and said second sensed voltage;

generating a first sensed voltage corresponding to said first input power line;

generating a second sensed voltage corresponding to said second input power line;

comparing said first sensed voltage and said second sensed voltage and generating an output signal; and driving either said third terminal or said sixth terminal based on said output signal to connect either said first input power line or said second input power line having a higher sensed voltage.

15. The method as claimed in claim 14, further comprising the steps of:

providing a third switch having a seventh terminal, an eighth terminal and a ninth terminal, between said first input power line and a connected load;

connecting said seventh terminal to the load;

connecting said eighth terminal to said node;

driving said ninth terminal suitably to regulate charging current and charging voltage to the load.

16. The method as claimed in claim 14, further comprising the steps of:

providing a fourth switch having a tenth terminal, a eleventh terminal and a twelfth terminal and a fifth switch having a thirteenth terminal, a fourteenth terminal and a fifteenth terminal, between said node and a switching node;

connecting said eleventh terminal to said node;

connecting said thirteen terminal to ground;

connecting said tenth terminal and said fourteenth terminal to the switching node; and driving said twelfth terminal and said fifteenth terminal suitably to regulate charging current and charging voltage to the load.

* * * * *